United States Patent [19]

Royle

[11] Patent Number: 5,611,669

[45] Date of Patent: Mar. 18, 1997

[54] TURBINES WITH PLATFORMS BETWEEN STAGES

[75] Inventor: Eric E. Royle, Wigston, United Kingdom

[73] Assignee: Eupopean Gas Turbines Limited, United Kingdom

[21] Appl. No.: 534,562

[22] Filed: Sep. 27, 1995

[30] Foreign Application Priority Data

Sep. 27, 1994 [GB] United Kingdom .................. 9419544

[51] Int. Cl.$^6$ ...................................................... F01D 11/00
[52] U.S. Cl. .................... 416/193 A; 416/198 A; 415/173.7
[58] Field of Search ........................ 416/193 A, 198 A, 416/201 R, 220 R; 415/173.7

[56] References Cited

U.S. PATENT DOCUMENTS

| 2,656,147 | 10/1953 | Brownhill et al. | 416/193 A |
| 3,551,068 | 12/1970 | Scalzo et al. | 415/173.7 |
| 4,277,225 | 7/1981 | Dubois et al. | 416/193 A |

FOREIGN PATENT DOCUMENTS

| 667194 | 2/1952 | United Kingdom | 416/193 A |
| 706730 | 4/1954 | United Kingdom | 415/173.7 |
| 877708 | 8/1961 | United Kingdom . | |
| 1236920 | 6/1971 | United Kingdom . | |
| 1395957 | 5/1975 | United Kingdom . | |
| 1565749 | 4/1980 | United Kingdom . | |
| 2127906 | 4/1984 | United Kingdom . | |
| 2228217 | 8/1990 | United Kingdom . | |

*Primary Examiner*—James Larson
*Attorney, Agent, or Firm*—Kirschstein, et al.

[57] ABSTRACT

Turbines having rotor blades (3, 5) fixed in dovetail grooves (14) in the rotor periphery have bridge pieces (17) which provide in effect a false floor to the inter-stage recess (8, 11) to close off the machining recess from the fluid path. This invention provides a method of fixing this bridge piece which is simple, positive and avoids loading the rotor disc rims with additional centrifugal force. The dovetail groove (14) for the blade root is continued into a raised portion or the rotor recess periphery. This raised portion is grooved circumferentially (21) and the stem (19) of the 'T' section bridge piece fits snugly in the groove. A dovetail section key (23) is inserted through the blade root dovetail groove (14) and into the raised portion of the rotor, passing through a hole in the stem (19) of the bridge piece. The latter is thus positively located and locked in position.

7 Claims, 4 Drawing Sheets

TURBINES WITH PLATFORMS BETWEEN STAGES

BACKGROUND OF THE INVENTION

This invention relates to turbines, which term is used in this specification to mean rotary machinery which is driven by or which drives a working fluid such as gas or steam by means of rings of blades mounted on a rotor to intercept the working fluid in an annular passage. The invention is of particular application to gas turbine compressors for providing compressed air to the fuel combustion process, but it is not limited to this application.

A gas turbine compressor has a rotor with rings of blades spaced along the axis so as to interleave with rings of fixed blades extending inwardly from the compressor casing. This invention is concerned with the rotor blades and the smooth flow of fluid (air) from each ring of blades to the next.

On a compressor rotor the moving blades are often fitted with dovetail roots which engage complementary grooves in the respective rotor disc so holding the blades against the very large centrifugal forces that a rise. The dovetail section blade root may be fitted to the rotor in circumferential grooves, or more commonly, grooves which are axial or skewed to the rotor axis according to the particular aerofoil section of the blade.

The machining of the dovetail grooves in the rotor, where these grooves are axial or skewed to the axis, requires circumferential recesses in the rotor in front of each ring of blades and to a radial depth below that of the roots of the downstream blades. The term front of is taken to mean "upstream of" and correspondingly "behind" is taken to mean "downstream of". In a compressor, as the flow moves downstream and the gas is compressed, the annular passage is made smaller by increasing the rotor diameter and reducing the height of the blades.

In a conventional machine this stepping of the rotor diameter assists the machining in that the inter-stage recess has to be only marginally deeper than the downstream blade root.

In any event the inter-stage recess would take the gas flow out of the direct path between the aerofoil Sections of the blades, the resulting turbulence causing losses. This is normally prevented by providing bridge pieces which effectively close off the recess and provide a smooth inner boundary to the flow, limiting it to the annular region of the blade aerofoil section.

One method of fitting such bridge pieces is to fit platform-like pieces in grooves in the upstream and downstream razes of the rotor discs close to the rim of the discs. The bridge pieces are fitted into the grooves through a machined window and then slid around the grooves to their required positions.

Allowance is made for expansion of the bridge pieces both axially and circumferentially and consequently seals are required. Additionally stop plates and springs may be required to be fitted to prevent uncontrolled circumferential sliding of the bridge pieces.

A further disadvantage of this method of providing bridge pieces is that the grooves on the faces of the rotor discs for receiving the bridge pieces necessitate an increase in the axial spacing of the stages beyond that required for entry of the blade root on assembly.

Again, the centrifugal force on the bridge pieces is carried as an additional load on the disc rim which is already highly stressed by the forces in the rotor blades.

An object of the present invention is to provide a turbine having bridge pieces which very largely avoid the above disadvantages.

SUMMARY OF THE INVENTION

According to the present invention in a turbine including a rotor, a plurality of stages of moving blades mounted on the rotor, each moving blade having a root of dovetail section mounted in a complementary groove extending axially or skewed to the axial plane in the periphery of the rotor, the rotor periphery in the recess between at least some adjacent blade stages has a stepped profile comprising a high level section and a low level section, the dovetail section groove extending into the high level section and the low level section providing axial and radial clearance for a cutting tool to enter or exit the dovetail section groove, and the turbine further includes between the adjacent blade stages a circumferentially extending series of bridge pieces providing an tuner boundary to the working fluid flow path, each bridge piece being keyed to the high level sect/on of the rotor periphery by a key at least partially conforming to the dovetail section groove and lying within the extension of the dovetail section groove in the high level section.

Each bridge piece preferably comprises a platform surface providing the boundary and a circumferentially extending wall section supporting the platform and located in a circumferential groove in the high level section of the rotor periphery, the wall section having a hole through which the key extends, the engagement of the key and the hole preventing movement of the bridge piece radially and circumferentially.

The key being of dovetail cross-section the end of the key which engages the bridge piece wall section is preferably relieved on its radially inner face to provide a shoulder on the key which abuts the bridge piece wall section axially and prevents axial movement of the key.

The wall section and the platform may together provide a 'T' section in an axial plane, the stem of the 'T' lying approximately midway along the axial extent of the recess.

The bridge piece may comprise two wall sections supporting the platform, the two wall sections being spaced apart in respective grooves in the high level section of the recess and the key extending through holes in both the wall sections.

The junction between adjacent bridge pieces in a series may be angled to the axial direction.

A turbine compresor having bridge pieces in accordance with the invention will now be described, by way of example, with reference to the accompanying drawings, in which:

DETAILED DESCRIPTION OF EMBODIMENTS OF THE INVENTION

Figure 1:
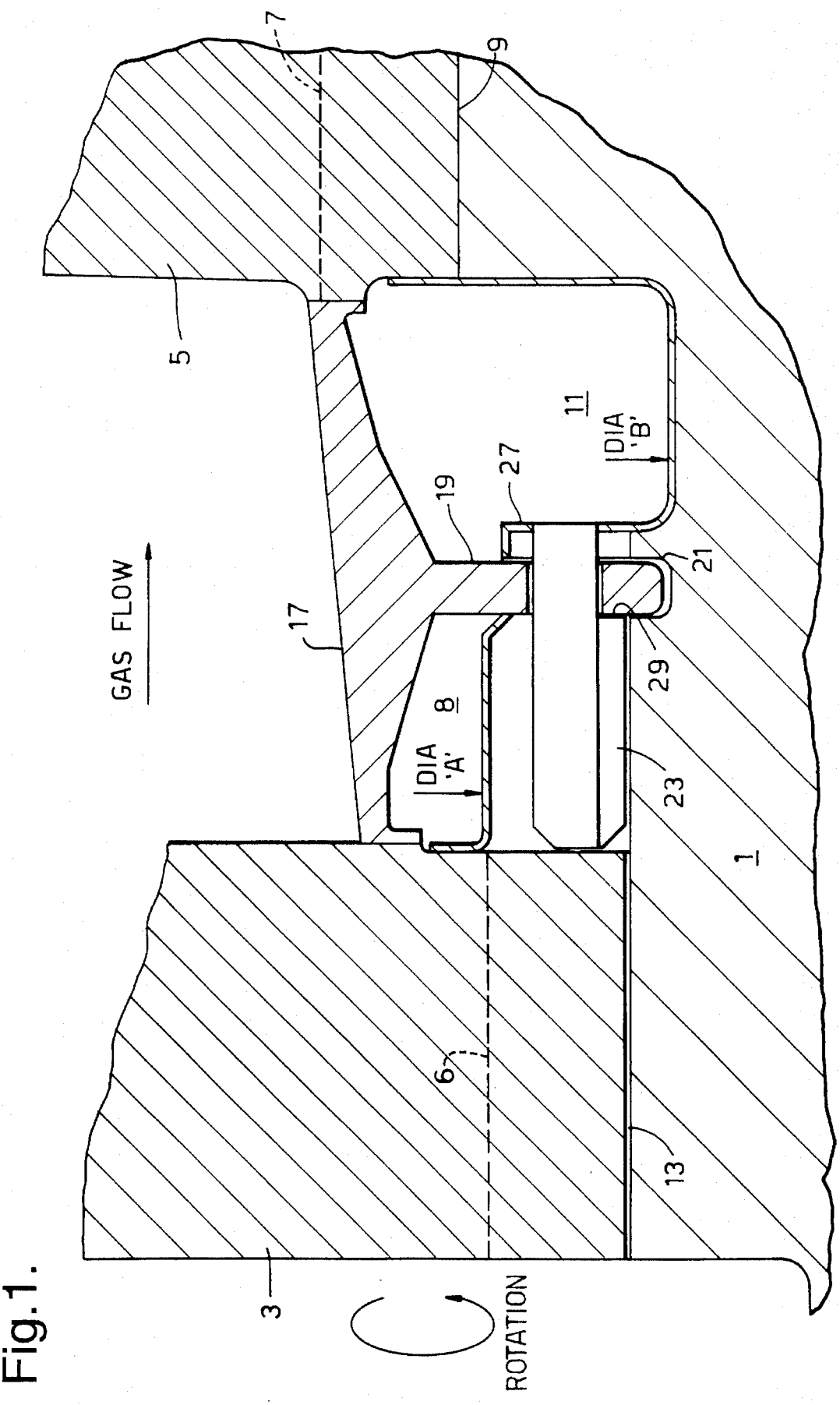
FIG. 1 is an axial section of part of the compressor rotor and parts of two rotor blades in successive stages.

Referring to the drawings, the rotor 1 is fitted with successive tings of blades of which 3 indicates a blade in a particular stage and 5 indicates a blade in the next downstream stage. The upper part of these blades is of aerofoil section and the lower part, below approximately the broken lines 6 and 7, is of dovetail section in known manner, the axis of the dovetail running at an angle of 20° or so to the rotor axis. This skewing of the blade and its root may be seen more clearly in FIG. 2.

In a conventional compressor the recess between successive blade stages is of uniform or continuously varying diameter and extends to a depth below the innermost extremity of the blade roots. The rotor is usually in the form of separate discs keyed to a shaft and each blade stage is mounted on its own rotor disc. The recess is therefore partially formed by the opposing faces of the disc rims and these downstream and upstream faces are grooved close in the rim periphery to receive bridge plates as described above.

In the present embodiment of the invention, applicable for example to a one piece rotor body for successive rows of rotor blades or a rotor made up of discs on a shaft or a composite of both, the upstream part 8 extending for rather more than half the axial extent of the recess and having a diameter 'A' preferably just less than that of the downstream-blade root extremity 9. The downstream part, 11, of the profile has a diameter 'B' just less than that of the upstream blade root extremity 13.

Figure 2:
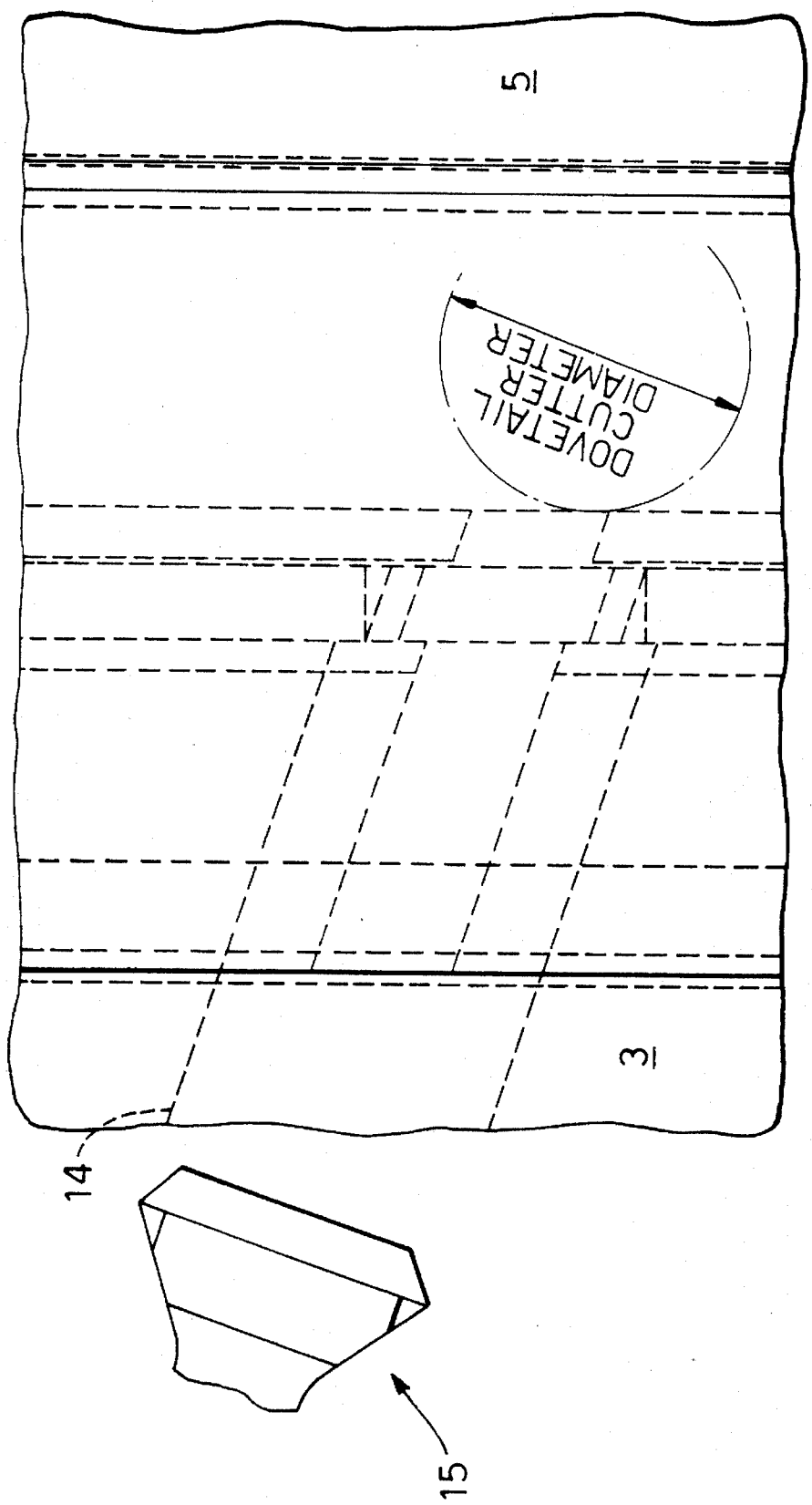
FIG. 2 is a plan view, i.e. looking radially inwards, of the region between the blades of FIG. 1.

The dovetail groove 14 for the root of blade 3 in the rotor 1 (i.e. in the rotor disc carrying blade 3) has a cross-section as shown by the outline of the projection 15 in FIG. 2. This dovetail groove 14 extends right through the rim of the disc (below the line 6 in FIG. 1) and is continuous through the rotor forming the upstream part g of the recess. The cutter with which this groove 14 is cut can thus pass through the rotor beneath the line 6. through the rotor in the upstream past 8 of the recess, and is then free to be removed from the downstream part 11 of the recess. The axial extent of the part 11 of the recess is greater than the maximum diameter of the cutter, i.e, the width of the groove 14 in FIG. 2.

While it is convenient that, in the lower-pressure stages of the compressor the blade root extremity (e.g. in FIG. 1) is clear of diameter 'A' for ease of insertion of the cutter for blade 5, this will not be so in the higher-pressure stages. The cutter can nevertheless then be lowered radially into the downstream part 11 of the recess if the rotor diameter at blade root 9 is less than diameter 'A' of the upstream recess.

The whole extent of the recess 8 and 11 is required to be closed off to gas flow which is required to pass smoothly from the aerofoil section of blade 3 to the aerofoil section of blade 5. A platform-like bridge piece 17 extends between the two blades, forming a lower boundary to the gas flow. The platform part is supported by a circumferentially extending wall section 19. The bridge piece 17 extends circumferentially in an arcuate manner and may cover several blade pitches.

The bridge piece is of 'T' section, as shown in FIG. 1, the platform forming the cross-bar of the 'T' and the wall section 19 the stem of the 'T' which fits into a circumferential groove 21 in the upstream recess rotor. The 'T' section is preferably balanced for centrifugal forces in a rotor axial plane (i.e. the plane of FIG. 1) and therefore the stem 19 is approximately central in the recess. The upstream portion of the rotor in the recess thus extends for more than half of the recess axial extent to allow room for the groove 21.

Figure 3:
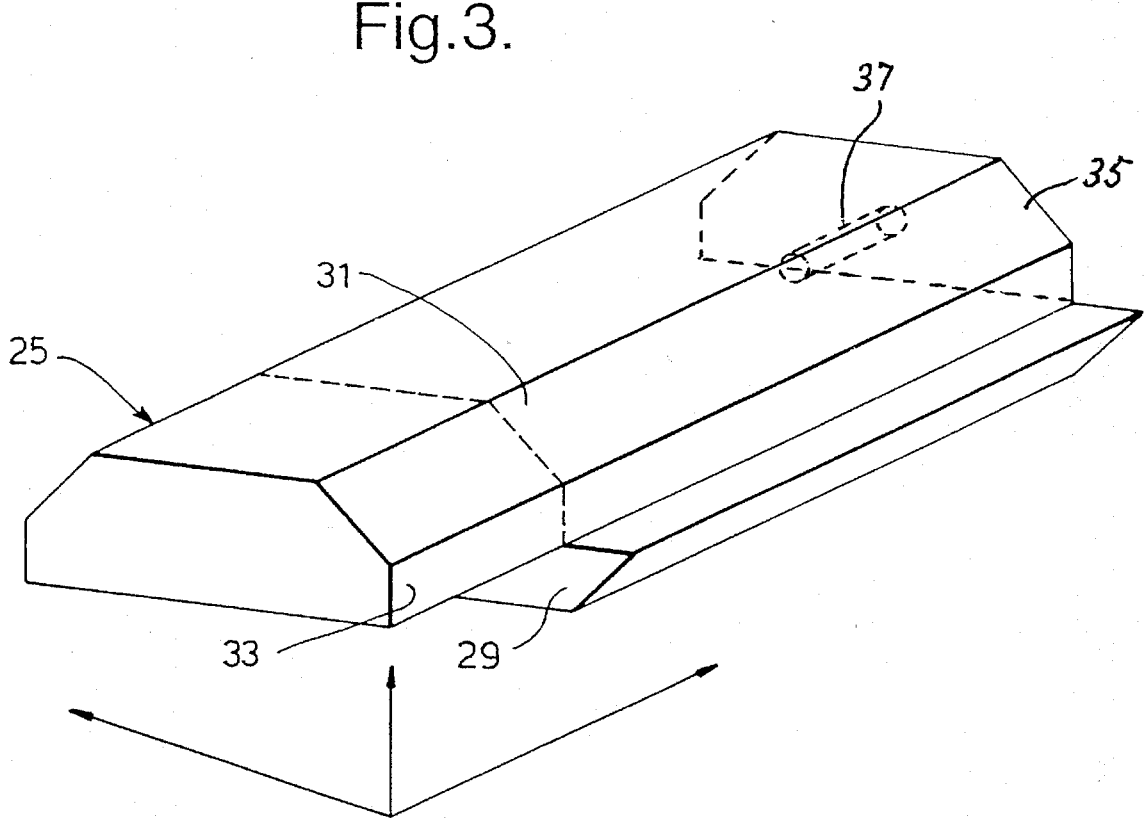
FIG. 3 is a perspective view of a dovetail locking piece shown in FIGS. 1 and 2, the perspective axes being indicated separately.

Movement of the bridge piece is prevented by a dovetail locking piece or key 23 which is shown in perspective view in FIG. 3. This locking piece has the same cros-ssection as the root of blade 3 and thus fits snugly in the dovetail groove 14 in that portion within the recess part 8. The downstream end 25 of the locklag piece passes through a hole in the stem 19 and extends into an end part of the dovetail groove 14 in a wall 27 formed by the groove 21. In order that the stem 19 has sufficient 'body' under the locking piece 23, rear (i.e. downstream) end 25 of the locking piece is relieved as shown. This has the advantage of providing a shoulder or abutment face 29 on the locking piece which engages the stem 19 and prevents the locking piece escaping downstream into the recess portion 11.

The hole in the stem 19 may be rectangular, i.e. not engaging the locking piece on the 'dovetail surfaces' 31. The lower part of these surfaces may also be removed to make vertical surfaces 33 conforming to the side walls of the rectangular hole in the stem 19. Since the dovetail groove 14 is skewed to the rotor axis the ends of the locking piece 23 are correspondingly angled to conform to the circumferential planes of the rotor and root of the blade 3.

While the term "dovetail" has been used to describe the form of the blade root section and its complementary groove, the term is intended to cover any wedge formation.

The method of assembly is as follows (a) The bridge piece 17 is fitted into position with the hole in the stem 19 in line with the dovetail slot 14.

(b) The locking dovetail piece 23 is entered into the front (i.e. upstream) end of the dovetail slot and passed through until the reduced nose section projects through the 'T' stem and slightly into the downstream recess 11.

(c) The dovetail root of blade 3 is now entered into dovetail slot 14 and pushed into position in abutment with the bridge piece 17. The locking piece 23 is thus prevented from moving upstream.

(d) This procedure is repeated until all of the bridge pieces 17, locking dovetail pieces 23 and blades 3 are in position.

(e) The blades 3 are then locked in position by the next (upstream) ring of bridge pieces and the process repeated through all the stages. The leading (upstream) stage blades may be fixed by locking tabs or by staking.

The following advantages are provided by the design described above:

(1) Each bridge piece is individually located and locked in position.

(2) Axial clearances ate maintained by the accurate location of the stem of the bridge piece in in groove.

(3) Stop plates and springs to prevent circumferential drafting of the bridge pieces—a feature of conventional designs—are not required.

(4) The bridge pieces can be light in weight compared to conventional designs.

(5) The accurate location of the bridge pieces by means of the stem and groove fitting permits tight fitting seals to be inserted between the bridge pieces and the rotor discs and between adjacent bridge pieces.

(6) The bridge pieces act as axial locking devices on the adjacent stages of moving blades.

(7) The centrifugal force on the bridge piece is carried on the main part of the rotor body and not as an additional load on the highly loaded bladed disc as in conventional designs.

(8) No locking tabs, requiring bending over, are needed on any stage except possibly the front face of the first stage.

(9) The centrifugal force of the bridge piece is carried on the locking piece extension in double shear.

(10) The dovetail locking piece is radially supported along its full length including the section after the groove.

Certain refinements and modifications may be found desirable. Thus:

(1) The junction between adjacent bridge pieces can be angled to reduce turbulence created by the joint passing the fixed blade tips and hence reduce vibratory excitation of the fixed blades.

(2) Careful attention to the masses of the individual bridge and locking pieces can lead to reduction of potential unbalance forces.

(3) The ends 35 of the dovetail locking pieces can be drilled and tapped at 37 (see FIG. 3) for the insertion of an extraction tool.

(4) The wings of the bridge piece are preferably balanced for centrifugal force taking account of the difference in radii and the relative length of the wings. This balancing is done in both axial and circumferential planes.

Figure 4:
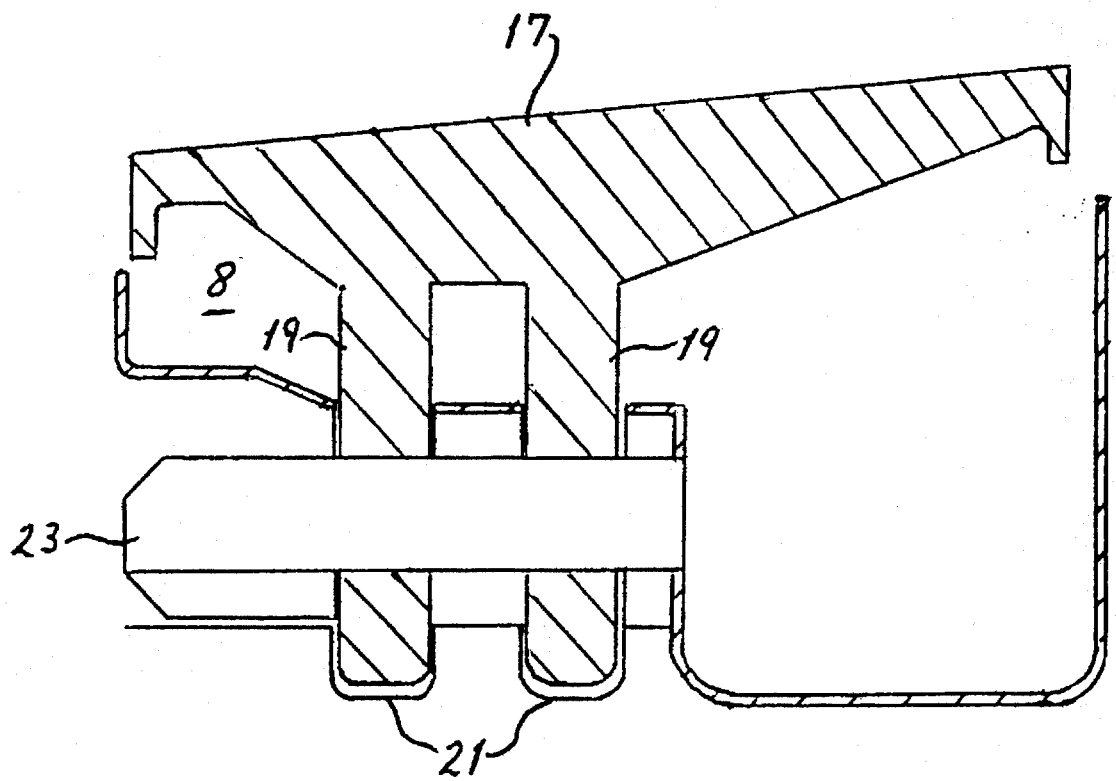
FIG. 4 is an axial section of another embodiment of this invention.

(5) The bridge pieces 17 may be provided with double stems 19 fitting into respective circumferential grooves 21 in the high-level recess section 8. This would put the locking piece 28 into multiple shear, giving lower overall attachment shear stresses (see FIG. 4).

What is claimed is:

1. A turbine for a working fluid, comprising:

a rotor rotatable about an axis and having a periphery;

a plurality of stages of blades mounted on the rotor, each blade having a root of dovetail cross-section mounted in a complementary groove extending approximately axially in the periphery of the rotor, the rotor periphery in a recess between at least some adjacent blade stages having a stepped profile that includes a high level section and a low level section, the dovetail groove having an extension extending into the high level section, the low level section providing axial and radial clearance for a cutting tool to access the dovetail groove;

a circumferentially extending series of bridge pieces between said adjacent blade stages and providing an inner boundary to a flow path of the working fluid, each said bridge piece having a platform surface providing said inner boundary and a circumferentially extending wall section supporting said platform surface and located in a circumferential groove in the high level section of the rotor periphery;

at least one key for each bridge piece and having a cross-section at least partially conforming to said dovetail groove and lying within the extension of said dovetail groove in said high level section, said wall section having a hole through which said key extends, said key engaging said hole for preventing radial and circumferential movement of the respective bridge piece, and said wall section engaging said circumferential groove for preventing axial movement of the respective bridge piece.

2. The turbine according to claim 1, wherein said key is of dovetail cross-section and has an end which engages the bridge piece wall section, said key end being relieved on a radially inner face to provide a shoulder on the key which abuts the bridge piece wall section axially and prevents axial movement of the key.

3. The turbine according to claim 2, wherein said wall section and said platform surface together provide a "T" section in an axial plane, said "T" section having a stem lying approximately midway along the axial extent of the recess.

4. The turbine according to claim 1, wherein said high level section of the rotor recess profile lies at an upstream side of the recess.

5. The turbine according to claim 1, wherein the bridge piece has two said wall sections for supporting said platform surface, the two wall sections being spaced apart in respective grooves in the high level section of said recess, and said key extending through holes in both said wall sections.

6. The turbine according to claim 1, wherein adjacent bridge pieces in a said series have junctions which are angled to the axis.

7. The turbine according to claim 1, wherein each said key is adapted for attachment of an extraction tool to extract the key along said dovetail groove when a root of an adjacent blade is removed.

* * * * *